United States Patent Office 3,506,709
Patented Apr. 14, 1970

3,506,709
PROCESS FOR THE PRODUCTION OF
LOWER FATTY ACIDS
Takeo Nakamura, Musashino-shi, Tokyo, and Hiroshi
Murayama and Tatsuya Yamaguchi, Tokyo, Japan, assignors to Tekkosha Co. Ltd., Tokyo, Japan, a corporation of Japan
No Drawing. Continuation-in-part of application Ser. No. 349,178, Mar. 3, 1964. This application June 1, 1967, Ser. No. 642,721
Int. Cl. C07c 51/18, 51/22
U.S. Cl. 260—533         2 Claims

ABSTRACT OF THE DISCLOSURE

A process for oxidizing a petroleum fraction using a multicomponent catalyst consisting essentially of 1 part cobalt to 1–10 parts of one or two second metals selected from the group consisting of Na, Ba, Al, Pb and Ni.

CROSS REFERENCE TO RELATED APPLICATION

This application is a continuation-in-part of Ser. No. 349,178, filed Mar. 3, 1964, now abandoned.

BACKGROUND OF THE INVENTION

Field of the invention

This invention relates to a process for producing lower monobasic fatty acids by oxidizing paraffinic, naphthenic or paraffinic-naphthenic liquid hydrocarbons having boiling points lower than 200° C. with oxygen or an oxygen-containing gas in the liquid phase and, in particular, relates to an improved process for producing acetic acid.

DESCRIPTION OF THE PRIOR ART

Since lower fatty acids, particularly acetic acid, can be produced, as compared with other conventional processes, at an extremely low cost by a process in which a paraffinic, naphthenic or paraffinic-naphthenic liquid hydrocarbon is, in the liquid phase, oxidized with oxygen or an oxygen-containing gas, this process is of major industrial interest and many investigations of this process have been made. In this process, the oxidized products usually consist of a wide variety of fatty acids, esters, carbonyl compounds, alcohols and water because of the complicated reaction mechanisms. Artificial means for controlling the amounts and ratios of the respective products have not been very successful. It is known that the ratio of fatty acids to nonacidic materials produced by the reaction can be changed by controlling the extent of the reaction, e.g., by prolonging the oxidation period, and that the ratio of each lower fatty acid, in particular, the producing ratio of acetic acid to formic acid, which are the main products of the process, can be slightly changed by suitably selecting the starting hydrocarbons.

However, the effects obtained by these techniques are slight and are not fundamental ones. Hence, the conventional procedures known for practicing the aforesaid process of producing lower fatty acids do not make it possible to closely control the producing ratio of the oxidized products and this greatly reduces the industrial profitability of such a process.

It usually has been desired to increase the producing ratio of, in particular, acetic acid to formic acid which are the main products of such a process. Control over the formation of formic acid is also very desirable in order to reduce corrosion of the apparatus.

SUMMARY OF THE INVENTION

Therefore, a main object of this invention is to increase the producing ratio of acetic acid to formic acid in the aforementioned oxidation process by utilizing a special catalyst in the process.

Another object of this invention is to increase the yields of the useful lower fatty acids by reoxidizing the residual fraction which is obtained from the oxidized products after the available fatty acids have been recovered.

The inventors have found, as the results of various investigations about the processes for producing lower fatty acids by liquid-phase oxidation of hydrocarbons having boiling points lower than 200° C. with oxygen or an oxygen-containing gas, that the formation of formic acid can be controlled and the relative amount of acetic acid can be greatly increased by employing a catalyst having a special composition. Hitherto, the importance of the selection of the catalyst for such oxidation reactions has not been fully recognized. It has been considered previously that the selection of the catalyst only has a slight influence on the length of the reaction period and on the prevention of the accumulation of peroxides. However, it has not been appreciated that the catalyst may have a fundamental effect on the essential reaction mechanisms.

Further, the inventors have found that lower fatty acids are not obtained in reasonable yields merely by reoxidizing the remaining oxidized products left over after available fatty acids have been recovered, following an oxidation as aforesaid. These remaining oxidized products have boiling points higher than those of fatty acids having 1–4 carbon atoms. However, by reoxidizing them together with additional feed hydrocarbons, additional amounts of lower fatty acids can be produced in a good yield. The inventors have found, also, that in such a case, the formation of formic acid is controlled and the amount of acetic acid produced can be increased very effectively by adding the catalyst of the present invention to the reoxidation system.

As the results of detailed studies about the influences of the compositions of catalysts on the compositions of the reaction products, in particular, on the producing ratio of acetic acid/formic acid (this ratio is denoted as "$\alpha$" hereinafter), the inventors have unexpectedly found that catalysts consisting essentially of Co and one or two of the metals selected from the group consisting of Na, Ba, Al, Pb and Ni, in particular, Co—Na, Co—Ni, Co—Pb, Co—Al catalysts remarkably increase the numerical value of $\alpha$. The amount of the second metal to be used together with Co may be in a range of 1 to 10 parts by weight of the second metal to 1 part by weight of Co. If the content of the second metal is too small, the oxidation reaction results become similar to that obtained using Co only and if too large, the effect of using Co is reduced. In either case, the producing ratio $\alpha$ of acetic acid to formic acid is not increased.

For example, when the 50–150° C. fraction (66.2 wt. percent paraffinic hydrocarbons, 29.5 wt. percent naphthenic hydrocarbons and 4.3 wt. percent aromatic hydrocarbons) of Middle East petroleum were air-oxidized in the liquid phase under the usual conditions of reaction temperatures of 160–165° C., reaction pressures of 40–45 kg./sq. cm. and conversion of 95%, the value was 13.4–18.5 using a Co—Ni binary catalyst, while the $\alpha$ value was 6.5–7.4 using Co—Al catalyst, 3.9–4.4 using no catalyst and using a Pb catalyst, 2.8–4.0 using Cr, Mg, Fe, Ni, etc., alone as the catalyst and 1.7–2.3 or 2.0–3.1 using a Mn or Ce catalyst. The $\alpha$ value was 3.92 using a Mn–Cu catalyst, 2.16 using a Ni—Mn catalyst, 3.42 using a Ni—Cr catalyst and 2.04 using a Mn—Co catalyst. Also, when the 30–100° C. fractions (containing 42.7 wt. percent paraffinic hydrocarbons, 52.2 wt. percent naphthenic hydrocarbons and 2.9 wt. percent aromatic hydrocarbons) of natural gasoline were oxidized in the liquid phase under reaction conditions similar to the above-described conditions, the $\alpha$ value was 8.3–11.5 using a Co—Na—Ba ternary catalyst, 8.5–11.2 using a Co—Pb binary catalyst and 7.0–8.8 with the binary catalyst Co and Al, whereas the α value was 2.5–2.9 with no catalyst, 1.8–2.3 with a Mn catalyst and 2.5–3.8 with a Cr catalyst.

It should be noticed that the Co-containing multicomponent catalysts used in the present invention have, in the oxidation reaction of this invention, the additional unexpected property, completely different from that of many catalysts known as oxidation catalysts for general organic compounds, viz., the property of increasing the α value.

The metals of such Co-containing multicomponent catalysts may be used in the form of organic salts, such as, naphthenates, octylates, acetates, and the like, or inorganic salts, such as, carbonates, nitrates, and the like, or oxides, hydroxides or free acids wherein the metals are present as ions, such as stannic acid and the like, or the salts or the complex salts of the free acids, or the metals may be also used in the metallic form. However, they may be used with particular advantage in the form of organic-acid salts soluble in the reaction system.

A suitable amount of catalyst, considering just the weight of the metals, is 0.01–1 wt. percent based on the weight of feed oil. If the amount of the catalyst used is too small, the effect of increasing the α value is reduced. If the amount of catalyst used is too large, the α value will not be further substantially increased. Thus, larger amounts of the catalyst could be used but without any benefit resulting therefrom.

The fractions of the oxidized products obtained by the reaction of this invention, in the presence of the aforementioned catalysts, can be generally divided into the following three fractions:

(1) The fractions distilled at temperatures lower than about 99° C. under the presence of water (these fractions are denoted as "light fractions" hereinafter), (2) the fraction consisting of aliphatic monocarboxylic acids have 1–4 carbon atoms and water, and (3) residues having boiling points higher than about 170° C., (these residues are denoted as "high-boiling-point residues" hereinafter).

The "light fractions" are a mixture mainly consisting of nonacidic materials having a complicated composition consisting of various alcohols, esters and carbonyl compounds. The "high-boiling-point residues" are also a mixture having a very complicated composition, mainly consisting of naphthenic acids, and various keto acids and hydroxy acids, and containing higher alcohols, esters, and carbonyl compounds together with dibasic acids, such as, succinic acid and adipic acid.

The "light fractions" and the "high-boiling-point residues" are of such complicated compositions that they have almost no usability as such, but by mixing these fractions with the feed hydrocarbons after separating them from the oxidation products and then reoxidizing the mixture, lower fatty acids can be produced additionally from these "light fractions" and "high-boiling-point residues." In these cases, it has been found also that the use of the Co-containing multicomponent catalysts of this invention increases the producing ratio α of acetic acid to formic acid.

That is, the effect of the various catalysts on the producing ratio α of acetic acid/formic acid in the oxidation of a mixture of feed hydrocarbons and the "light fractions" is similar to that in the case of the oxidation of only the feed hydrocarbons. Hence, by using in this case, a catalyst consisting of Co and one or two metals selected from the group consisting of Na, Ba, Al, Pb and Ni, the producing ratio of acetic acid/formic acid is very markedly increased. For example, when the 50–150° C. fractions of Middle East petroleum were air-oxidized until the absorption of oxygen was almost stopped, at reaction temperatures of 144–165° C. and reaction pressures of 35 kg./sq. cm., using as the catalyst a mixture of cobalt naphthenate and nickel naphthenate (Co:Ni=1:1.5) in such amount that the total amount of the catalyst calculated as the metals, was 0.1 wt. percent of the feed oil, 60.2 wt. percent acetic acid, 3.8 wt. percent formic acid, 10.5 wt. percent "light fractions" and 28.8 wt. percent "high-boiling-point residues" based on the weight of the reacted hydrocarbons were obtained. When the mixture of one part of the "light fractions" and two parts by weight of the feed oil was oxidized again under the same conditions as above, 84.2 wt. percent acetic acid, 5.1 wt. percent formic acid (the producing ratio of acetic acid/formic acid=16.5), and 15.0 wt. percent "light fractions" were obtained based on the total consumed hydrocarbons. This shows that 48.0 wt. percent acetic acid and 2.6 wt. percent formic acid (α=18.4) were obtained based on the consumed weight of the "light fractions" added in the second oxidation.

Also, the influence of the Co-containing multicomponent catalysts according to the present invention on the producing ratio α of acetic acid to formic acid in the case of oxidizing a mixture of the "high-boiling-point residues" and the feed oil is substantially the same. That is, in the mixed system, while the producing ratio α of acetic acid to formic acid by using catalysts other than the Co-containing multicomponent catalysts according to the invention is extremely small as compared with that obtained in the oxidation of only the feed oil, the producing ratio obtained by using the multicomponent catalysts of this invention is extremely large.

For example, the "high-boiling-point residues" recovered in the oxidation of the 50–150° C. fractions of the above-mentioned Middle East petroleum was mixed with 200 wt. percent of the feed hydrocarbons and the mixture was oxidized again under the same conditions as the first oxidation. The producing ratio of acetic acid/formic acid was 1.2–1.6 in the case of no catalyst, 1.0–1.5 with Cr, Mg, Fe, or Ni, 1.0–1.3 with Mn or Ce, and 3.0–3.5 with Co. When the multicomponent catalysts consisting of Co and one or two metals selected from the group consisting of Na, Ba, Al, Pb and Ni were used, the producing ratio was greatly increased, viz., it was 8.5–11.3 with Co—Ni, 10.5–13.4 with Co—Pb and 10.2–15.0 with Co—Na—Ba.

Thus, the Co-containing multicomponent catalysts according to the present invention have the effect of increasing the producing ratio of acetic acid to formic acid for mixed systems comprising the feed hydrocarbons and the "light fractions," or the "high-boiling-point residues."

Also, the same effect can be obtained using "high-boiling-point residues" from which dibasic acids, such as succinic acid, have been removed.

The process of this invention for producing lower fatty acids by oxidizing the feed hydrocarbons with or without mixing the above-mentioned "light fractions" and/or "high-boiling-point residues" can be carried out in a batchwise operation or a continuous operation.

The reaction temperature may be 120–240° C., preferably 140–200° C. If the reaction temperature is lower than about 120° C., the reaction rate is low and if higher than 240° C., the yields of the lower fatty acids are reduced and corrosion of the reaction vessel becomes a serious problem.

As the reaction pressure is given by the sum of the vapor pressures of the feed hydrocarbons or the mixed feed comprising feed hydrocarbons and the "light fractions" or the "high-boiling-point residues," and the pressure of the oxidizing gas, the pressure to be used cannot be shown definitely.

As the oxidizing gas, oxygen or an oxygen-containing gas, such as air, is used. In order to carry out the oxidation reaction at an economically suitable reaction rate, it is necesasry to increase the partial pressure of oxygen higher than a selected value. For example, when the feed hydrocarbons having boiling points of 50–150° C. or 100–200° C. (the vapor pressures are 8.3 kg./sq. cm. and 1.5 kg./sq. cm. respectively at 150° C.) are oxidized, the suitable reaction pressure is usually 10–80 kg./sq. cm. and 5–60 kg./sq. cm., respectively.

As the feed stocks for this invention, all paraffinic hydrocarbons, naphthenic hydrocarbons and mixtures thereof having boiling points lower than 200° C., can be used. The presence of aromatic hydrocarbons does not disturb the oxidation but since aromatic hydrocarbons scarcely take part in the formation of the lower fatty acids which is an object of this invention, the content of aromatic hydrocarbons should preferably be small. As the feed stocks suitably for carrying out the process of this invention practically, there can be used straight run gasoline from petroleum and natural gasoline, said gasolines having a maximum boiling point as mentioned above. However, if the feed stocks contain a large amount of oxidation-disturbing materials, such as sulfur compounds, which are undesirable for the oxidation reaction, it is preferable to subject the feed stocks to a known purification treatment, by such as, a treatment with concentrated sulfuric acid, aluminum chloride and hydrogen.

DESCRIPTION OF THE PREFERRED EMBODIMENTS

The invention will be further explained in detail by reference to the following examples:

EXAMPLE 1

The oxidation apparatus consisted of a one liter stainless-steel vertical autoclave, fitted with an electromagnetic-type vertically moving agitator, a gas inlet, and means for measuring the tempenature. The autoclave was charged with 265 g. of the 50–150° C. fractions (containing 66.2 wt. percent paraffinic hydrocarbons, 29.5 wt. percent naphthenic hydrocarbons, and 4.3 wt. percent aromatic hydrocarbons) of Kuwait petroleum, in which 2.6 g. of cobalt naphthenate and 3.4 g. of nickel naphthenate were dissolved. The temperature was raised and the air was introduced into the autoclave at a rate of 200 l./hr. calculated into normal pressure. The oxidation was continued while maintaining a gauge pressure of 40 kg./sk. cm., and a temperature of 138–165° C. The waste gas was discharged from the end of the reflux condenser. When the conversion reached 95%, the reaction was stopped and 430 g. of an oxidate liquid were obtained. The oxidate liquid contained 8.6 g. of formic acid, 145 g. of acetic acid and 31.5 g. of propionic acid and butyric acid.

For comparing the effects obtained by the process of this invention, an example of the case wherein no catalyst was used is as follows. The feed oil having the same composition as above was oxidized up to the conversion of 95% under the same conditions except that no catalyst was added in this case. 435 g. of an oxidate liquid containing 28.2 g. of formic acid, 115 g. of acetic acid and 5.6 g. of propionic acid and butyric acid was obtained.

EXAMPLE 2

The oxidation apparatus consisted of a stainless-steel autoclave of 8 cm. inside diameter and 1 m. in length, fitted with an air inlet, and a liquid outlet at the bottom and a reflux condensor for discharging waste gas at the upper part.

The autoclave was charged with 2 l. of nature gasoline having a boiling point of the range 30–100° C. and the composition shown below. The reaction temperature and the pressure were maintained at 160–165° C. and 45 kg./sq. cm. gauge, respectively. Air was introduced into the system through the gas inlet and the air feed rate was increased gradually such that it became 1250 l./hr. after one hour (calculated into normal pressure), and then the feed rate was kept at that value. After an induction period of about one hour, the oxygen absorption became violent. After carrying out the oxidation for 9.5 hours in a batchwise operation, the reaction system was shifted into a continuous oxidation operation. Namely, after 9.5 hours, 200–230 cc. of the feed oil containing 2.8 g. of sodium naphthenate and a mixture of 0.6 g. of cobalt acetate, 0.2 g. of barium acetate, 1.3 g. of water and 6.5 g. of acetic acid were introduced into the reactor during every hour through the liquid inlet and the reaction was continued while withdrawing the oxidate liquid through the liquid outlet in order that the liquid in the reactor was maintained at a constant level. During the steady-state reaction period of 35–45 hours an oxidized product was obtained containing formic acid, acetic acid, and propionic acid+butyric acid in the yields of 5.3 wt. percent, 57.8 wt. percent and 13.4 wt. percent, respectively, based on the weight of the oxidized feed hydrocarbons.

As a comparison, another test was conducted wherein an Mn catalyst was used. The same feed oil was introduced into the same reaction apparatus, 8.6 g. of manganese naphthenate was first added in 2 l. of the feed oil and the reaction was carried out in a batchwise fashion for eight hours at a reaction temperature of 160–165° C. and a pressure of 45 kg./sq. cm. gauge. Thereafter the system was shifted into a continuous operation. That is, the oxidation conditions were continued while introducing into the system 220–250 cc./hr. of the feed oil containing 0.6 wt. percent of manganese naphthenate through the liquid inlet and withdrawing the reaction liquid in order that the liquid in the reactor was maintained at a constant level. The yields of formic acid, acetic acid and propionic acid+butyric acid in the oxidized product recovered during the steady-state reaction period of 25–35 hours were 18.5 wt. percent 41.2 wt. percent and 9.2 wt. percent, respectively, based on the weight of the oxidized feed hydrocarbons.

The composition of the feed oil used in this example was as follows:

| | Wt. percent | | Wt. percent |
|---|---|---|---|
| Neopentane | 1.0 | 2-methylpentane ⎫ | 5.8 |
| 2-methylbutane | 3.5 | 3-methylpentane ⎭ | |
| n-Pentane | 6.2 | n-hexane | 7.1 |
| Dimethylbutane | 0.5 | methylcyclopentane | 13.7 |
| Cyclopentane | 8.3 | benzene | 1.5 |
| Cyclohexane | 15.0 | n-heptane | 11.3 |
| | | Methylcyclohexane | 10.0 |
| 2-methylhexane | | Toluene | 1.4 |
| | | 7.3 | |
| 3-methylhexane | | Others | 2.2 |
| Dimethyl cyclohexane | 5.2 | | |
| Naphthenic hydrocarbons | | | 52.2 |
| Paraffinic hydrocarbons | | | 42.7 |
| Aromatic hydrocarbons | | | 2.9 |
| Others | | | 2.2 |
| Total | | | 100 |

EXAMPLE 3

A batchwise oxidation was carried out for 9.5 hours using the same oxidation apparatus, feed hydrocarbons and under the same reaction conditions as in Example 2 and then the system was shifted to a continuous oxidation procedure with the reaction temperature and reaction pressure being increased to 160–182° C. and 65–75 kg./sq. cm., respectively. The feed ratios into the reactor in the steady state of the continuous oxidation reaction were 200–230 cc./hr. of the feed hydrocarbons, 40 cc./hr. of the "light fractions," 0.3 g./hr. of cobalt acetate, 7.6 g./hr. of aluminum acetate, 1.3 g./hr. of water, 6.5 g./hr. of acetic acid and 1250 l./hr. of air (calculated at normal pressure). During 20 hours of the steady-state continuous oxidation period, the product obtained comprised 5.0 parts by weight of formic acid, 68.8 parts by weight of acetic acid and 12.2 parts by weight of propionic acid and butyric acid based on 100 parts by weight of the reacted hydrocarbons.

EXAMPLE 4

The continuous oxidation was carried out by using the feed materials as in Example 3 to which were added the "high-boiling-point residues." After the steady-state oxidation had been carried out for 25 hours by using the feed materials as in Example 3 together with 75 cc./hr. of the "high-boiling-point residues," the oxidized product contained 6.1 parts by weight of formic acid, 83.2 parts by weight of acetic acid, and 15.6 parts by weight of propionic acid and butyric acid based on 100 parts by weight of the reacted hydrocarbons. The producing ratio α of acetic acid to formic acid was 13.6. In the oxidation, no accumulation of the "light fractions" and "high-boiling-point residues" occurred.

EXAMPLE 5

The autoclave described in Example 1 was charged with 260 g. of the 130–200° C. fraction (consisting of 19.0 wt. percent paraffinic hydrocarbons, 80.0 wt. percent naphthenic hydrocarbons and 1 wt. percent aromatic hydrocarbons) in which were mixed 0.1 wt. percent cobalt naphthenate and 0.2 wt. percent lead naphthenate and the mixture was oxidized with oxygen for six hours at a reaction temperature of 125–147° C. and a reaction pressure of 25 kg./sq. cm. after the induction period. In the oxidized product, 12.6 g. of formic acid and 111 g. of acetic acid were obtained and 116 g. of "high-boiling-point residues" were separated by distillation. The "high-boiling-point residues" were mixed with 232 g. of the feed oil containing the above-mentioned catalysts and this mixture was oxidized again with oxygen for six hours after the induction period under the above reaction conditions. The oxidized product contained 6.3 parts by weight of formic acid and 61 parts by weight of acetic acid based on 100 parts by weight of the reacted hydrocarbons and the producing ratio of acetic acid to formic acid was 9.7. For comparison, the above procedures were repeated using only 0.2 wt. percent cobalt naphthenate as a catalyst. The product of the second oxidation contained 16.7 parts by weight of formic acid and 51.9 parts by weight of acetic acid based on 100 parts of the reacted hydrocarbons. The producing ratio of acetic acid to formic acid was only 3.2 in this case.

EXAMPLE 6

When the same feed hydrocarbons were oxidized under the same conditions, but using catalysts of different compositions, the following results were obtained:

TABLE 1

| Catalyst Co–Ni | Producing Ratio of acetic acid/ formic acid |
| --- | --- |
| Weight ratio of Co=Ni: | |
| 4:1 | 6.5 |
| 1:1 | 10.6 |
| 1:3 | 17.8 |
| 1:10 | 8.0 |
| Nickel alone | 4.5 |
| Catalyst Co—Pb | |
| Weight ratio of Co:Pb: | |
| 4:1 | 7.0 |
| 1:1 | 10.2 |
| 1:3 | 11.4 |
| 1:10 | 7.6 |
| Lead alone | 6.8 |

EXAMPLE 7

When the same feed hydrocarbons were oxidized under the same condition, using different amounts of the same catalyst consisting of 30% by wt. of Co and 70% by wt. of Ni, the following results were obtained:

| Amount of the catalyst calculated as metals (percent based on feed hydrocarbon): | Producing ratio of acetic acid/formic acid (α) |
| --- | --- |
| 0.01 | 5–6 |
| 0.1 | 7–8 |
| 0.2–0.3 | 16–17 |
| 1.0 | 17–18 |
| 2.0 | 17–18 |

The embodiments of the invention in which an exclusive property or privilege is claimed are defined as follows:

1. A process for the production of alkanoic monocarboxylic acids having 1–4 carbon atoms, which comprises:
   oxidizing in a liquid state a petroleum fraction consisting essentially of a mixture of paraffinic and naphthenic hydrocarbons having boiling points lower than 200° C., the oxidizing reaction being carried out at reaction temperatures in the range of 120–240° C. with an oxidizing agent selected from the group consisting of molecular oxygen and an oxygen-containing gas in the presence of a multicomponent catalyst consisting essentially of cobalt and one or two second metals selected from the group consisting of Na, Ba, Al, Pb and Ni, in which the total amount of catalyst used calculated as the metals is in the range of about 0.01–1 wt. percent based on the weight of the feed hydrocarbons, and in which the amount of the second metal in the catalyst is in the range of about 1–10 parts by weight of the second metal to 1 part by weight of cobalt, calculated as the metals, to form oxidation products containing alkanoic monocarboxylic acids having 1–4 carbon atoms and in which the ratio of the weight of acetic acid to the weight of formic acid is relatively high.

2. A process for the production of alkanoic monocarboxylic acids having 1–4 carbon atoms, according to claim 1, which includes the further steps of distilling the thus obtained oxidation products to obtain:
   (1) fractions distilled at temperatures lower than about 99° C. under the presence of water (light fractions),
   (2) fractions consisting of alkanoic monocarboxylic acids having 1–4 carbon atoms and water and in which the ratio of the weight of acetic acid to the weight of formic acid is relatively high, and
   (3) distillation residues having boiling points higher than about 170° C. (high-boiling-point residues);
   recovering said alkanoic monocarboxylic acids, recycling and mixing at least one of said light fractions and said high-boiling-point residues with the feed hydrocarbons, oxidizing them at reaction temperatures of 120–240° C. with the oxidizing agent in the presence of the multicomponent catalyst to form oxidation products having compositions similar to the above compositions, and recovering alkanoic monocarboxylic acids having 1–4 carbon atoms from the products of the second oxidation reaction.

References Cited

UNITED STATES PATENTS

| 2,734,067 | 2/1956 | Chapman et al. | 260—533 |
| 2,265,948 | 12/1941 | Loder et al. | 260—533 |
| 2,800,504 | 7/1957 | Elce et al. | 260—533 |
| 2,395,010 | 2/1946 | Othmer et al. | 260—533 |
| 2,861,923 | 11/1958 | Elce et al. | 203—84 |

LORRAINE A. WEINBERGER, Primary Examiner

D. E. STENZEL, Assistant Examiner

U.S. Cl. X.R.

252—466, 472, 473, 474